Nov. 12, 1968  C. THOMPSON  3,410,601
WINDSHIELD PROTECTIVE DEVICE
Filed April 26, 1967

INVENTOR
COURT THOMPSON

BY

ATTORNEY

United States Patent Office 3,410,601
Patented Nov. 12, 1968

3,410,601
WINDSHIELD PROTECTIVE DEVICE
Court Thompson, 4203 Dodge St.,
Omaha, Nebr. 68131
Filed Apr. 26, 1967, Ser. No. 633,787
4 Claims. (Cl. 296—95)

ABSTRACT OF THE DISCLOSURE

A removable windshield protective device for application midway of the width of a windshield for automotive vehicles, having roller curtains capabile of being drawn over the windshield from the center to each side edge thereof, the device being attached by means of vacuum cups.

This invention relates to removable protective devices for windshields, and more particularly to devices for the protection of windshields of automotive vehicles against the accumulation of frost, ice, snow, sap from trees, and other undesirable accumulations while the vehicle is at rest.

A principal object of the invention is to make available an accessory of the nature described which can readily and without substantial effort be applied to the windshield of an automotive vehicle by any operator of such a vehicle.

Another object is to make available easily applicable means to protect windshields against the accumulation of frost, ice, snow, sap from trees and other undesirable accumulations while the vehicle is at rest, such means being of simple, economical and practical construction.

For a more complete understanding of the invention, reference is made to the accompanying drawings and specification delineating and describing a preferred embodiment of the invention in greater detail.

In the drawings

Figure 1:
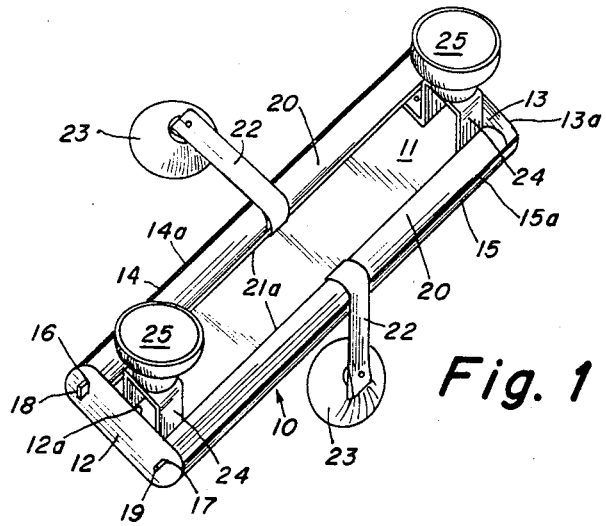
FIGURE 1 is a perspective view of the invention.

The device comprises a unitary housing 10 of sheet metal, preferably shaped by stamping, and bent to form a back 11, end walls 12 and 13, and side walls 14, 15. The end walls are punched to provide oppositely disposed slots 16 and circular holes 17 which receive and support the correspondingly shaped stud ends 18, 19 of spring roller curtains 20. These roller curtains are similar to conventional shade rollers curtains except that they do not have the ratchet stop mechanism usually embodied in the conventional shade roller. This may, however, be provided if desired. The curtain material 21 may be any waterproof or water resistant and generally weatherproof fabric, but is preferably a commercially available vinyl covered rayon material. The leading, or free edge 21a of each curtain 21 has a centrally attached tie strap 22 secured to the terminal end of which a vacuum cup 23 is mounted for a purpose which will be explained.

Adjacent each end wall of the housing, and spaced from each other along a median longtudinal line extending along the said back, are a pair of brackets 24, these brackets being U-shaped in elevation and inverted as mounted, the brackets having feet 24a resting against the back 11 to which they are suitably affixed by means of rivets, bolts, welding or otherwise. Each of these brackets supports a vacuum cup 25 as shown.

The curtain rollers 20 are disposed one on each side of the said brackets 24, that is, between the brackets and the adjacent side wall of the housing, and the side wall of the housing is curved to conform to the curvature of the roller, and is spaced slightly therefrom. The free edges 14a, 15a of the respective side walls of the housing terminate short of a plane passing through the free edges 12a, 13a of the end walls thereof, and the vacuum cups 25, mounted on the brackets 24 project outwardly of said plane and of the housing.

Figure 2:
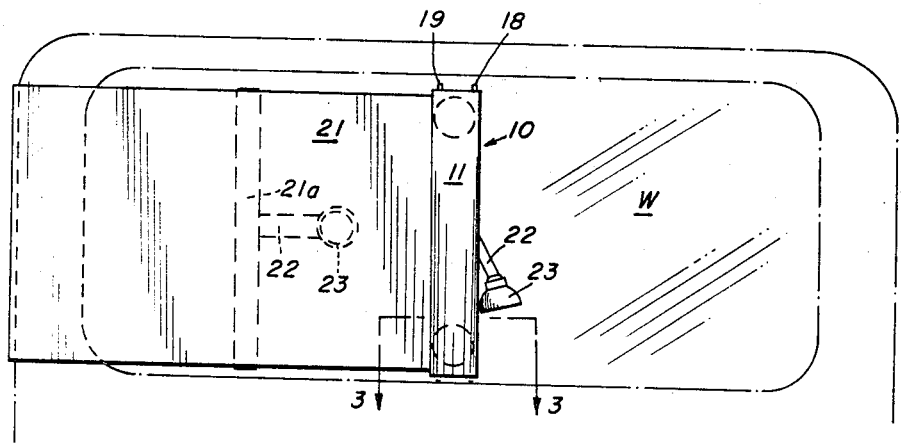
FIGURE 2 is a view from the back, showing the invention with the protective curtains partially withdrawn from their housing and applied to a windshield.
Figure 3:
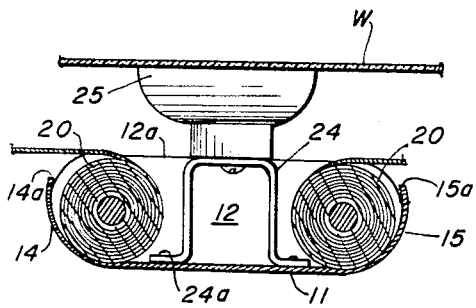
FIGURE 3 is a cross sectional view taken in the direction of the arows along the line 3—3 of FIGURE 2, with parts in elevation.

In use, the device is placed on the outside of the windshield W to be protected, substantially midway thereof and in a generally vertical position, and slight pressure exerted against it will cause the vacuum or suction cups 25 to grip the windshield. The grip will be more effective if the edges of the cups are moistened slightly before application. With the device so affixed, a tie strap 22 on one side is grasped to pull one curtain out of its housing and it is extended over the adjacent half of the windshield, substantially as shown in FIGURE 2. The door (not shown) of the vehicle adjacent that side of the windshield is opened and the curtain is passed between the door and the windshield frame. The tie strap is then extended and drawn taut along the inside of the vehicle and the terminal vacuum cup is secured to any appropriate portion of the interior of the vehicle, which may be the inside face of the windshield W. Or, without opening the door (not shown), the curtain may be drawn around the side of the door and the vacuum cup 23 may be affixed to the outside surface of the door glass (not shown). The other curtain is similarly treated and the whole windshield is then covered. This will adequately protect the windshield against the ravages of the weather and will eliminate the laborious and obnoxious scraping of undesirable accumulations from the windshield under adverse weather conditions.

Having thus described the invention, what is claimed is:

1. A protective device for windshields of the type having roller curtains and a support therefor, said device comprising a unitary housing having a back, end and side walls, brackets secured to said back wall and spaced from each other along a median line of said back wall, said brackets extending outwardly of said back wall, a roller curtain disposed adjacent each side wall on each side of said brackets, said roller curtains being supported by said end walls and disposed between them, a suction cup attached to each bracket, tie strings attached to the leading edge of each curtain and a vacuum cup secured to the free edge of each tie string.

2. A protective device according to claim 1 in which the side walls are curved to conform to the curvature of the roller curtains, the free end edges of said side walls terminating short of the free edges of said end walls.

3. A protective device according to claim 1 in which the vacuum cups on said brackets project outwardly of the free edges of said end walls.

4. A protective device according to claim 2 in which the vacuum cups on said bracket beyond the free edges of said end walls.

References Cited

UNITED STATES PATENTS

| 606,468 | 6/1898 | Lord. |
| 1,406,499 | 2/1922 | Sanberg. |
| 1,621,972 | 3/1927 | Darby _____ 296—97 X |
| 3,050,075 | 8/1962 | Kaplan et al. _____ 160—368 |

BENJAMIN HERSH, Primary Examiner.

J. A. PEKAR, Assistant Examiner.